US005964445A

United States Patent [19]

Pikovsky et al.

[11] Patent Number: 5,964,445

[45] Date of Patent: Oct. 12, 1999

[54] LOAD COUNTERBALANCING SYSTEM WITH A CONSTANT LOAD DISPLACEMENT FORCE

[75] Inventors: Anatoly Pikovsky, Sharon, Mass.; Andrew Roemer, Putnam, Conn.; Roger Plante, New Bedford, Mass.

[73] Assignee: LTX Corporation, Westwood, Mass.

[21] Appl. No.: 08/893,970

[22] Filed: Jul. 16, 1997

[51] Int. Cl.[6] .............................. F16M 1/00; G01D 18/00

[52] U.S. Cl. .............................. 248/646; 248/550; 73/825

[58] Field of Search ...................................... 248/646, 648, 248/550, 651, 669, 123.11; 177/164; 73/825

[56] References Cited

U.S. PATENT DOCUMENTS

| | | | |
|---|---|---|---|
| 4,047,427 | 9/1977 | Young | 73/141 A |
| 4,332,175 | 6/1982 | Krainski, Jr. | 73/825 |
| 4,591,128 | 5/1986 | Karlichek et al. | 248/652 |
| 4,846,436 | 7/1989 | Young et al. | 248/542 |
| 5,092,800 | 3/1992 | Hirt | 440/52 |
| 5,360,195 | 11/1994 | Young | 248/550 |
| 5,613,419 | 3/1997 | Pierson et al. | 91/361 |
| 5,626,332 | 5/1997 | Phillips et al. | 267/140.14 |

*Primary Examiner*—Derek J. Berger
*Assistant Examiner*—Anita M. King
*Attorney, Agent, or Firm*—Lappin & Kusmer LLP

[57] ABSTRACT

A load counterbalancing system with a constant load displacement force includes a load element, a position transducer and an actuator element. An environmental force acting upon the load element is counterbalanced by a support force provided by the actuator element. The environmental force is assumed to be a predetermined function of the position of the load element, and the actuator element applies the support force to the load element as defined by the predetermined function. The invention allows an operator to move the load element through its entire range of motion with a constant applied force, and to place the load element statically at any position in the range of motion.

25 Claims, 5 Drawing Sheets

100

LOAD COUNTERBALANCING SYSTEM WITH A CONSTANT LOAD DISPLACEMENT FORCE

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention relates to load counterbalancing systems, and more particularly, to load counterbalancing systems which provide a constant load displacement force to an operator.

BACKGROUND OF THE INVENTION

In many applications, a human operator must manipulate a heavy load which would ordinarily be beyond his or her physical abilities. One example is a factory assembly worker placing an automobile engine into an engine compartment. Another example is a test engineer aligning a electronic test head associated with a test station to a target system for embedded testing. Several prior art systems use counterbalancing techniques to allow an operator to manipulate such loads with little effort relative to the weight of the load. Prior art systems counterbalance with counterweights, constant force springs, air cylinder actuators with pressure regulators, conventional compression/extension springs, gas springs and combinations thereof. Counterweights, constant force springs and air cylinder actuators can counterbalance a constant load along a considerable length of travel, but they cannot counterbalance a load which varies with position or other physical parameters. As a result, the effort necessary to move a load varies as the load varies. Conventional springs and gas springs can counterbalance a variable load if the load variation coincides with the spring constant, but they cannot counterbalance over any considerable range of travel. The range of travel of conventional and gas springs is limited by the range of the spring itself. Use beyond the spring range will result in non-linear characteristics and eventually mechanical failure.

There is a need for a counterbalancing system which can counterbalance a load which varies with respect to position and other physical parameters over a significant, useful range of travel.

Accordingly, it is an object of this invention to provide an improved counterbalancing system for counterbalancing a variable load over a considerable range of travel.

Other objects and advantages of the present invention will become apparent upon consideration of the appended drawings and description thereof.

SUMMARY OF THE INVENTION

The present invention is directed to a load counterbalancing system with a constant load displacement force which in one aspect comprises a load element which is movable along a reference axis with respect to a base member, and is subject to an environmental force along the axis toward the base member. The environmental force experienced by the load element is a predetermined function of the position of the load element along the axis. The invention also includes a position transducer for generating a signal representative of the position of the load element along the axis, and an actuator responsive to the signal for applying a support force to the load element along the axis, substantially equal and opposite to the environmental force. The invention described herein places the load element in a state of equilibrium with respect the environmental force experienced by the load element over a range of motion, so that in order to move the load element the user must only overcome the breakaway and dynamic friction of the system. The invention allows an operator to move the load element through its entire range of motion with a constant applied force, and to place the load element statically at any position in the range of motion.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE INVENTION

The present invention is directed to load counterbalancing system with a constant load displacement force.

In general, the invention includes a load element, a position transducer and an actuator element. An environmental force acting upon the load element is counterbalanced by a support force provided by the actuator element. The environmental force is assumed to be a predetermined function of the position of the load element, and the actuator element supplies the support force to the load element as defined by the predetermined function. The invention described herein places the load element in a state of equilibrium with respect the environmental force experienced by the load element, so that in order to move the load element the user must only overcome the breakaway and dynamic friction of the system. The invention allows an operator to move the load element through its entire range of motion with a constant applied force, and to place the load element statically at any position in the range of motion.

Figure 1:
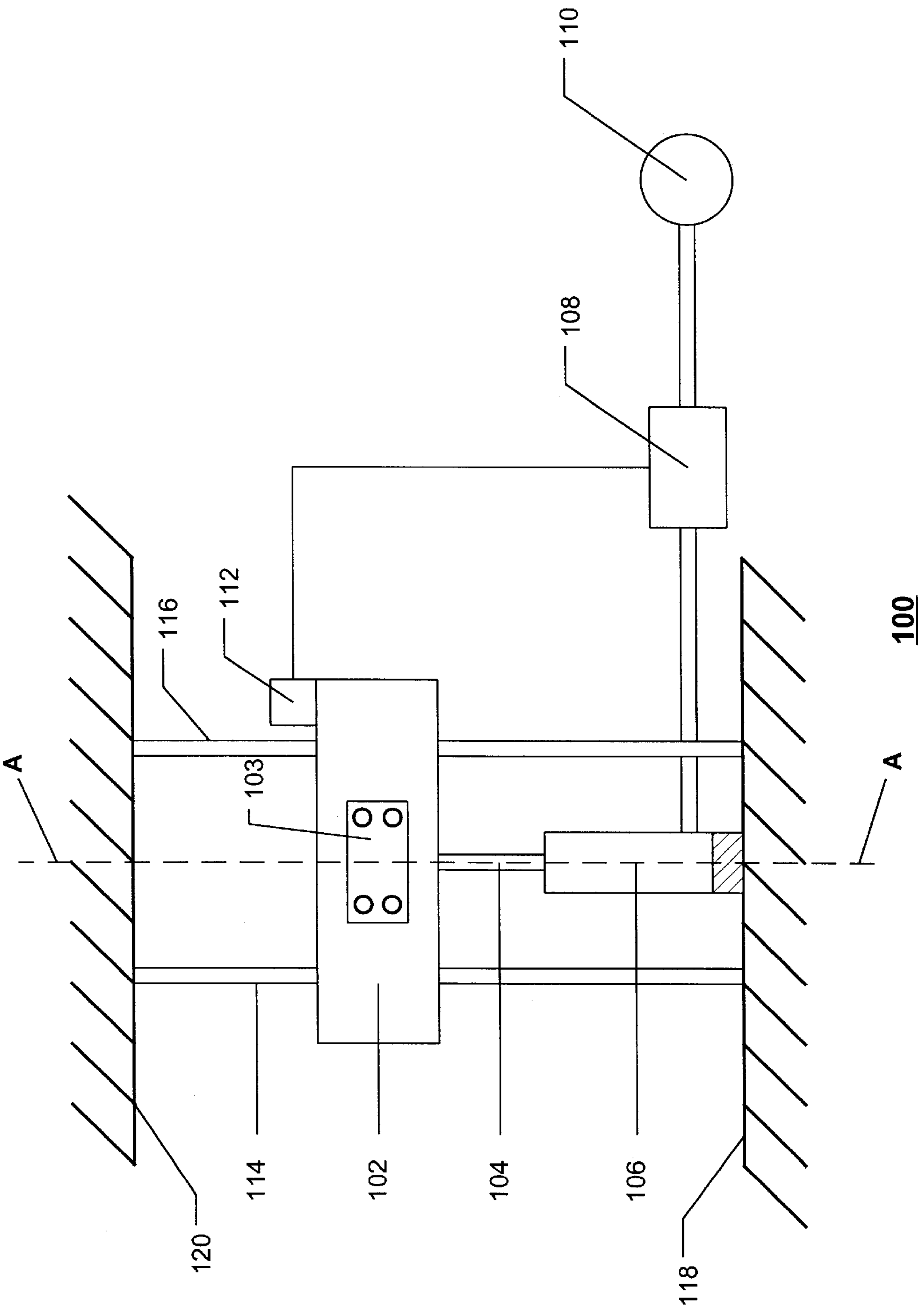
FIG. 1 shows a simplified block diagram of one embodiment of a load counterbalancing system with a constant load displacement force.

FIG. 1 shows a simplified block diagram of one embodiment of a load counterbalancing system 100 with a constant load displacement force in accordance with the present invention. The counterbalancing system 100 includes a load support element 102, at least one actuator element comprising an actuator arm 104, an actuator cylinder 106 and an electrical-pneumatic regulator 108, a high pressure air source 110 and a load position transducer 112. In this form of the invention, the actuator element is based on hydraulics and controls motion of arm 104 to be along axis A. Other means may be used to provide the support force, for example, hydraulics, gravity, centrifugal mechanics and electromagnetics.

In the illustrated embodiment of the invention, movement of the load support element 102 is limited to a single degree of freedom (along axis A) by a first guide rail 114 and a second guide rail 116, although those skilled in the art will recognize that other methods to limit movement may be used, and that more than a single degree of freedom may be used. The load support element 102 includes a mounting assembly 103 so that a general load, i.e., a load without a specific size or shape, may be secured to the load support element 102. In the illustrated embodiment of the invention, the bottom ends of the first guide rail 114 and second guide rail 116 are fixedly attached to a lower foundation 118, and the upper ends of the first guide rail 114 and second guide rail 116 are attached to an upper foundation 120.

The actuator cylinder 106 is fixedly attached to an immovable foundation, for example the floor or wall of a building, or to a structurally secure cabinet, so that vertical movement of the actuator is restrained. In FIG. 1, the actuator cylinder 106 is fixedly attached to the lower foundation 118. The actuator arm 104 is fixedly attached to the load support element 102 so that extension or retraction of the actuator arm extends or retracts the load support element 102, respectively, relative to the actuator cylinder 106. In order to reduce the breakaway friction inherent in the actuator arm/actuator cylinder assembly, one embodiment of the invention incorporates a Teflon composite bushing and synthetic oil at one or more of the mechanical interfaces between the actuator arm 104 and the actuator cylinder 106. Breakaway friction is the friction which must be overcome to initiate movement of the actuator arm 104 relative to the actuator cylinder 106.

Figure 2:
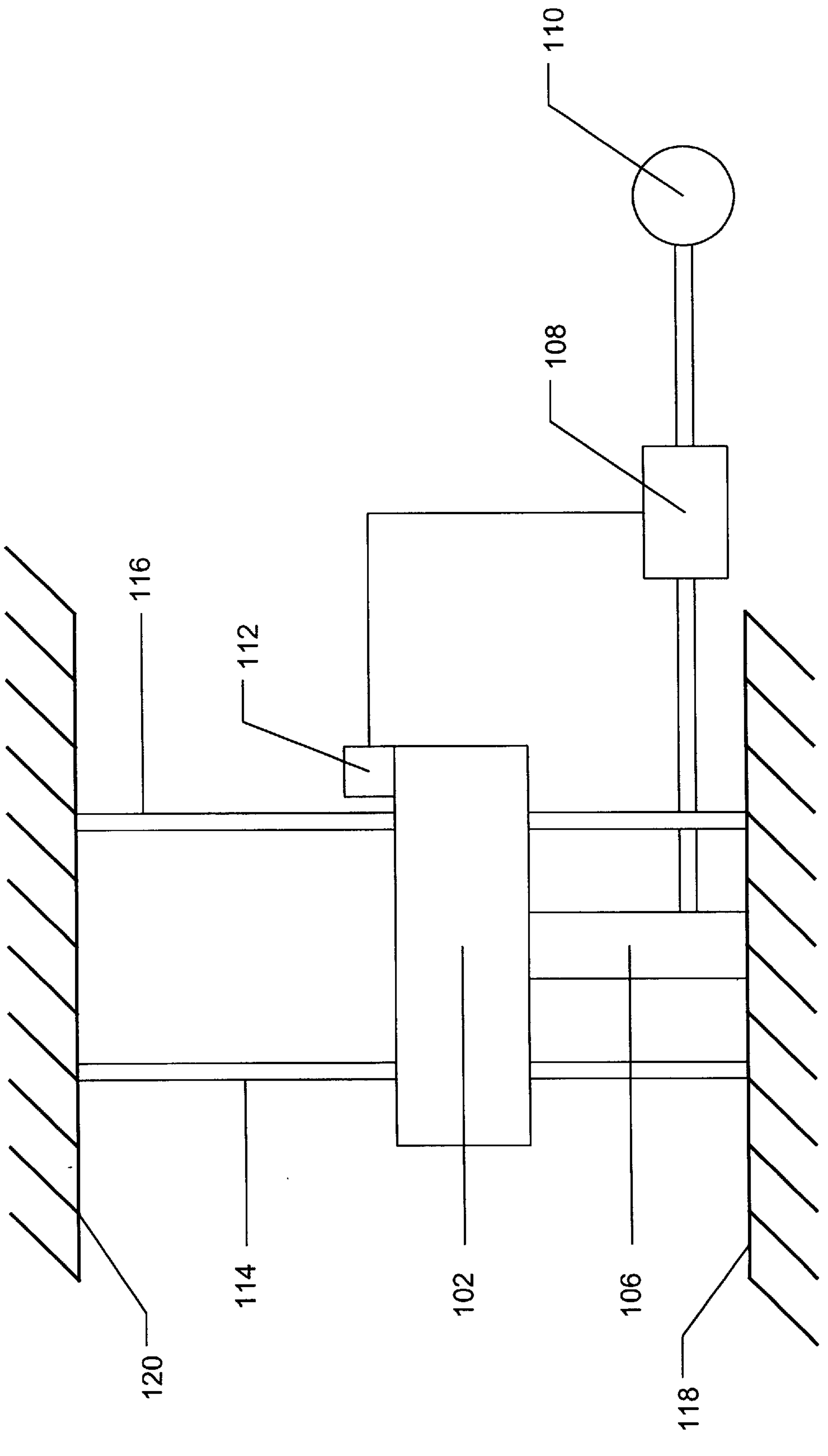
FIG. 2 shows a simplified block diagram of the counterbalancing system with the actuator arm in the fully retracted position.
Figure 3:
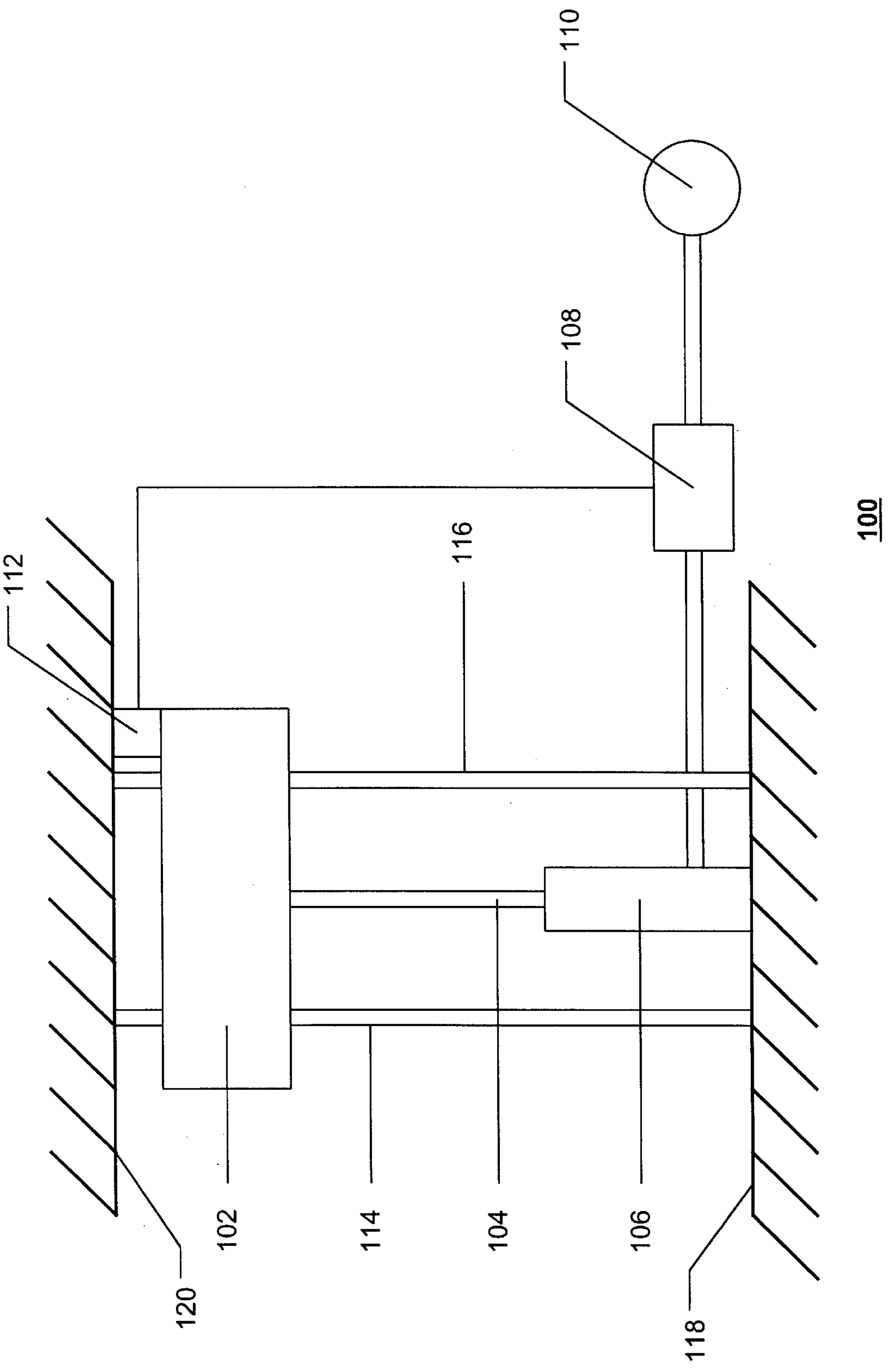
FIG. 3 shows a simplified block diagram of the counterbalancing system with the actuator arm in the fully extended position.
Figure 4:
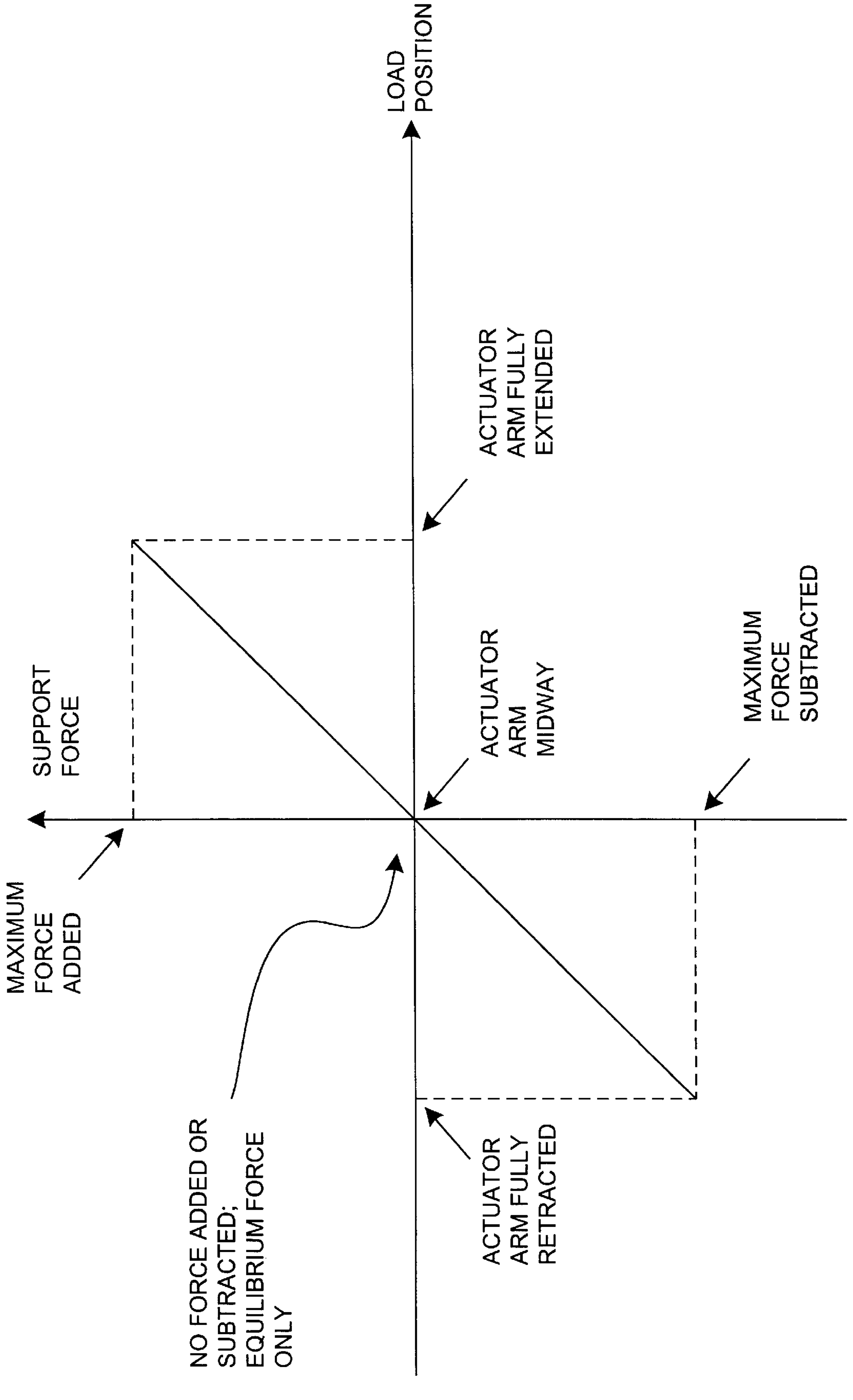
FIG. 4 graphically shows the support force-to-position relationship of one embodiment of the invention.

In the illustrated form of the invention, the position transducer 112 attaches to the load support element 102, and produces an electrical signal (hereinafter referred to as position signal) representative of the position of the load support element 102 relative to the actuator cylinder 106, although other methods of determining load element position may be used, including remote sensing. The position signal may include a continuous analog waveform, or discrete digital data elements, or combinations thereof. FIG. 2 shows the counterbalancing system 100 with the actuator arm 104 in the fully retracted position, and FIG. 3 shows the counterbalancing system 100 with the actuator arm 104 in the fully extended position. The regulator 108 translates the position signal as an amount of force to be applied to the load element 102 via the actuator. The regulator 108 is set to balance the environmental force that the load element 102 experiences when the actuator arm 104 is midway between the fully retracted position and the fully extended position. This support force is referred to as the initial equilibrium value. The regulator 108 increases the support force to the load element 102 with respect to the initial equilibrium value linearly as the position signal indicates increasing extension of the actuator arm 104. The added force is at the maximum value when the actuator arm 104 is in the fully extended position of FIG. 3. The regulator 108 decreases the force to the load element 102 with respect to the initial equilibrium value linearly as the position signal indicates increasing retraction of the actuator arm 104. The force subtracted from the equilibrium value is at the maximum value when the actuator arm 104 is in the fully retracted position of FIG. 2. The added force is zero when the actuator arm 104 is midway between the fully retracted position and the fully extended position. FIG. 4 graphically depicts how the actuator linearly increases and decreases the force to the load element 102 with respect to the initial equilibrium value in the present invention. In this case, the support force may be expressed as a linear function of the position; i.e., $F=mP+b$, where F is the support force, P is the position, m is a constant and b is a constant. The position-to-support force relationship of FIG. 4 is predetermined and repeatable; it is stored by the actuator, which in one form may include a programmable digital computer having a memory including data defining the position-to-support force relationship.

The environmental force acting upon the load element may include the force of gravity, the force due to a change in the load element velocity (e.g., centrifugal force and the force due to linear acceleration), a force from an external source (e.g., wind) and other forces known to those skilled in the art.

Figure 5:
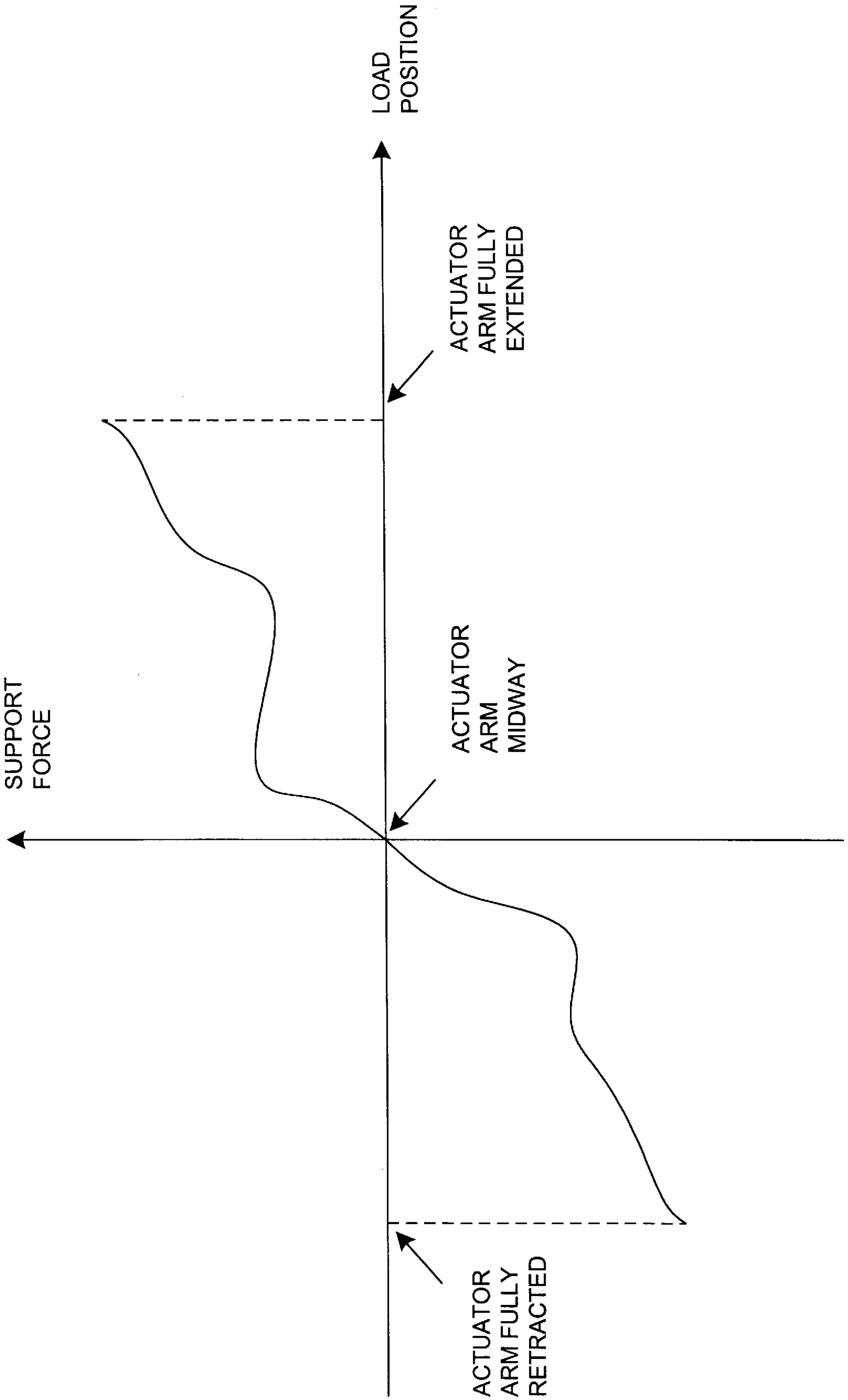
FIG. 5 graphically shows a non-linear support force-to-position relationship.

In other forms of the invention, the position-to-support force relationship may be non-linear and non-symmetrical about the equilibrium position, for example as shown in FIG. 5. In this case, the support force may be expressed as a single value, non-linear function of the position; i.e., $F=g(P)$, where F is the support force, P is the position, and $g(\ )$ is a single value, non-linear operator. In general, the support force needed to counterbalance the environmental force for each position of the load element 102 may be determined empirically and the corresponding position to support force transfer function stored, so that any position to environmental force relationship may be counterbalanced by the invention.

Likewise, the environmental force that the load element 102 experiences may be a function of parameters other than, or in addition to, position. For example, the environmental force experienced by load element 102 for a given position may vary with temperature. In such a case, the position/temperature-to-force relationship is dependent on two parameters. One form of the invention stores the emperically determined support forces necessary to counterbalance the environmental forces for all positions and for all temperatures within the range of interest. This form of the invention has a temperature transducer in addition to the position transducer, and the actuator element produces a support force dependent upon both position and temperature. In general, the support force may be a function of N physical parameters, where N is a positive integer. Possible physical parameters include, but are not limited to, temperature, time, velocity, acceleration and higher order derivatives of position with respect to time.

One form of the invention maintains the physical parameter-to-support force relationship in a look-up table, although the relationship may also be maintained as coefficients to a closed form solution, computed via means known in the art.

The LTX Universal Manipulator, specification number 835-0209-00, manufactured by LTX Corporation, Westwood, Mass., is one embodiment of the invention described herein. The Universal Manipulator enables an operator to manipulate a test head so that it can be docked to different types of probers and handlers. Various cable lengths trailed by the test head at various test head positions causes the load experienced by the manipulator to change as the test head is moved.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A load counterbalancing system, comprising:

A. a load element movable along a reference axis with respect to a base member, and being subject to an environmental force along the axis toward the base member, the environmental force being a predetermined function of the position of the load element along the axis;

B. a position transducer including means for generating a signal representative of the position of the load element along the axis;

C. an actuator including means responsive to the signal for applying a support force to the load element along the axis, substantially equal and opposite to the environmental force.

2. A load counterbalancing system according to claim 1, wherein the load element includes a support element having a mounting assembly for removably mounting a general load.

3. A load counterbalancing system according to claim 1, wherein the environmental force is selected from the group consisting of external applied force, gravitational force, and force due to a change in load element velocity.

4. A load counterbalancing system according to claim 1, wherein the predetermined function of position includes one or more parameters selected from the group consisting of time, temperature, and the $N^{th}$ derivative of position with respect to time, N being a positive integer.

5. A load counterbalancing system according to claim 1, wherein the position transducer includes a sensor fixedly attached to the load element.

6. A load counterbalancing system according to claim 5, wherein the signal includes a series of digital data elements.

7. A load counterbalancing system according to claim 5, wherein the signal includes a continuous analog signal.

8. A load counterbalancing system according to claim 1, wherein means responsive to the signal includes a regulator element which regulates the support force from a force reservoir as a function of the electrical output of the position transducer.

9. A load counterbalancing system according to claim 8, wherein the support force is selected from the group consisting of pneumatic force, hydraulic force, electromagnetic force, gravitational force, or centrifugal force.

10. A load counterbalancing system according to claim 1, wherein the means responsive to the signal includes an electrical-pneumatic regulator having a regulator input port pneumatically connected to a high pressure pneumatic source, a regulator output port pneumatically connected to the actuator, the regulator receiving the signal and regulating a pressure differential between the regulator input port and the regulator output port as a function of the electrical output of the position indicator, whereby the support force is provided by an output pressure at the regulator output port.

11. A load counterbalancing system according to claim 1, wherein means responsive to the signal includes a transfer function relating the force to the position.

12. A load counterbalancing system according to claim 11, wherein the transfer function is a linear function of the form F=mP+b, where F is the support force, P is the position, m is a constant and b is a constant.

13. A load counterbalancing system according to claim 11, wherein the transfer function is a non-linear function of the form F=g(P), where F is the support force, P is the position, and g( ) is a single value non-linear operator, whereby each instance of P produces a single F.

14. A method of counterbalancing a load, comprising the steps of:

A. providing a load element movable along a reference axis with respect to a base member, and being subject to an environmental force along the axis toward the base member, the environmental force being a predetermined function of the position of the load element along the axis;

B. generating a signal representative of the position of the load element along the axis;

C. in response to said signal, applying a support force to the load element along the axis, substantially equal and opposite to the environmental force.

15. A method according to claim 14, wherein the step of providing a load element further includes the step of providing a support element having mounting bracket for removably mounting a general load.

16. A method according to claim 14, wherein the step of providing a load element further includes the step of subjecting the load element to the environmental force selected from the group consisting of external applied force, gravitational force, and force due to a change in load element velocity.

17. A method according to claim 14, wherein the step of providing a load element further includes the step of subjecting the load element to the environmental force being a predetermined function of position, including one or more parameters selected from the group consisting of time, temperature, and the $N^{th}$ derivative of position with respect to time, N being a positive integer.

18. A method according to claim 14, wherein the step of generating a signal further includes the step of providing a sensor fixedly attached to the load element.

19. A method according to claim 18, wherein the step of generating a signal further includes the step of generating a series of digital data elements.

20. A method according to claim 18, wherein the step of generating a signal further includes the step of generating a continuous analog signal.

21. A method according to claim 14, wherein the step of applying a support force further includes the step of providing a regulator element which regulates the support force from a force reservoir as a function of the electrical output of the position transducer.

22. A method according to claim 21, wherein the step of supplying a support force further includes the step of selecting said support force from the group consisting of pneumatic force, hydraulic force, electromagnetic force, gravitational force, or centrifugal force.

23. A method according to claim 14, wherein the step of applying a support force further includes the step of providing a transfer function relating the force to the position.

24. A method according to claim 23, wherein the step of providing a transfer function further includes the step of providing a linear function of the form F=mP+b, where F is the support force, P is the position, m is a constant and b is a constant.

25. A method according to claim 23, wherein the step of providing a transfer function further includes the step of providing a non-linear function of the form F=g(P), where F is the support force, P is the position, and g( ) is a single value non-linear operator, whereby each instance of P produces a single F.

* * * * *